US006422702B1

(12) United States Patent
Uhlig et al.

(10) Patent No.: US 6,422,702 B1
(45) Date of Patent: Jul. 23, 2002

(54) METHOD FOR MONITORING FILM REMAINING IN A MOTION PICTURE FILM MAGAZINE

(75) Inventors: Ronald E. Uhlig, Pittsford; Robert O. James, Rochester; Charles C. Anderson, Penfield; Keith A. Walker, Canandaigua; David C. Markham, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/409,292

(22) Filed: Sep. 30, 1999

(51) Int. Cl.$^7$ .......................... G03B 1/60; G03B 19/18; G03B 21/50; G03B 7/00
(52) U.S. Cl. .......................... 352/172; 352/38; 352/92; 396/210
(58) Field of Search .................. 396/284, 210, 396/310, 319; 352/38, 92, 172, 78 C, 78 R, 236, 72, 44

(56) References Cited

U.S. PATENT DOCUMENTS

| 4,008,088 | A | | 2/1977 | Van Paesschen | 430/14 C |
|---|---|---|---|---|---|
| 4,341,855 | A | | 7/1982 | Morrison et al. | 430/140 |
| 4,418,994 | A | | 12/1983 | Gottschalk et al. | 352/78 R |
| 4,576,455 | A | | 3/1986 | Fazekas | 352/78 R |
| 4,619,511 | A | * | 10/1986 | Goto et al. | 396/284 |
| 4,627,695 | A | * | 12/1986 | Beauviala et al. | 352/72 |
| 4,758,851 | A | * | 7/1988 | Zeth | 396/284 |
| 4,864,332 | A | * | 9/1989 | Harvey | 396/210 |
| 4,893,921 | A | | 1/1990 | Beauviala | 352/92 |
| 4,965,627 | A | | 10/1990 | Robison | 355/40 |
| 4,987,431 | A | | 1/1991 | Harvey | 396/210 |
| 5,006,873 | A | | 4/1991 | Wash | 396/319 |
| 5,281,987 | A | * | 1/1994 | Nagata | 354/105 |
| 5,477,289 | A | | 12/1995 | Smart | 396/319 |
| 5,519,462 | A | | 5/1996 | Spencer et al. | 396/319 |
| 5,572,271 | A | * | 11/1996 | Pelican | 396/512 |
| 5,737,650 | A | | 4/1998 | Debesis et al. | 396/285 |
| 5,991,550 | A | * | 11/1999 | Sasagaki et al. | 396/319 |
| 5,995,769 | A | * | 11/1999 | Kumakura | 396/210 |
| 6,094,542 | A | * | 7/2000 | Itoh et al. | 396/319 |

FOREIGN PATENT DOCUMENTS

WO  90/15361  12/1990

OTHER PUBLICATIONS

"Datakode Magnetic Control Surface", Eastman Kodak Company, 1983 (Publicatin No. V3–517).

* cited by examiner

Primary Examiner—Russell Adams
Assistant Examiner—R. Fuller
(74) Attorney, Agent, or Firm—Andrew J. Anderson

(57) ABSTRACT

A method for monitoring the amount of unexposed photographic film remaining in a motion camera film magazine that includes the steps of: providing an unexposed motion picture film containing a support having at least one light sensitive image recording layer and a transparent magnetic recording layer; recording film length data on the transparent magnetic recording layer of the unexposed motion picture film; loading the unexposed motion picture film in a motion picture film magazine; and reading the film length data from the transparent magnetic recording layer as it is removed from the film supply magazine to provide an indication of the amount of unexposed film remaining in the motion picture film magazine. The amount of unexposed film remaining may be displayed in a read-out device associated with the film magazine or camera.

14 Claims, 5 Drawing Sheets

METHOD FOR MONITORING FILM REMAINING IN A MOTION PICTURE FILM MAGAZINE

FIELD OF THE INVENTION

The present invention relates generally to fields of motion picture, television and other multi-media production. More particularly, the invention relates to methods for monitoring the amount of unexposed film remaining in a motion picture film magazine by recording film length data on a transparent magnetic recording layer contained on a motion picture film.

BACKGROUND OF THE INVENTION

The typical configuration for motion picture cameras is to have a detachable film magazine with two separate film reels, one for unexposed film (supply reel) and one for exposed film (takeup reel). Such a film magazine has been described in U.S. Pat. Nos. 4,418,994 and 4,576,455, for example. Referring now to FIG. 1 of the prior art, film magazine 20 contains supply reel 23 and takeup reel 24. Film is conveyed from the supply reel 23 through the light trap block 30 into the interior of the motion picture camera 32. Alternatively, some pieces of equipment have separate magazines or cassettes, with again, one for unexposed film and one for exposed film. Referring now to FIG. 2 of the prior art, a motion picture camera 34, which for the purpose of illustration is depicted on tripod 35, has supply magazine 37 containing unexposed film and takeup magazine 36 containing exposed film attached to the body of the camera. The magazines depicted in FIGS. 1 and 2 are constructed in such a way to prevent light from exposing the film while it is in the magazine. An aperture exists that allows the end of the roll of film to protrude from the magazine and which allows additional film to be pulled from the roll in the magazine, or drawn into the magazine. Given the light-tight nature of the magazines, there is no direct way to observe the roll of film and specifically no direct way to determine the quantity of film in the supply chamber to assure that there is sufficient film available for a planned photographic event.

One method to infer the quantity of film in the supply magazine is to keep a written record, which is often kept on written labels on the front of the magazine, of the amount of film remaining in the magazine. For example, when the unexposed film is loaded into the magazine, a notation is made of the quantity of film that is placed in the magazine. During a photographic event, the amount of film being used can be determined by timing the duration of photography and multiplying that duration by the rate of film use by the camera or by consulting a counter on the camera or recording device that may be present to record film usage. The amount of film used is subtracted from the length of film known to exist in the magazine prior to photography and a new remaining length is recorded on the label or other record. This method is only as good as the fastidiousness of the record keeper, and there is no way, short of taking the magazine into a darkroom and opening the can and examining the roll by feel, to determine how much film is in the magazine.

Another method to infer the approximate quantity of film remaining in a magazine is to use a magazine which has a method for indicating the approximate diameter of the roll in the magazine, such as through the use of a spring loaded lever, one end of which contacts the outer diameter of the film roll as described in U.S. Pat. No. 4,418,994. The position of the level is transmitted to a dial or scale on the exterior of the magazine that can be viewed by the camera operator. The scale is calibrated to indicate the approximate length of the film remaining in the magazine. Referring again to FIG. 1. of the prior art, a calibrated stationary scale 26 fixed with respect to the magazine 20 cooperates with a pointer 28 attached to a spring loaded lever to provide a visual indication of the amount of film remaining on the supply reel 23. One disadvantage of this method is that all magazines are not equipped with this mechanism. Another is that it is only approximate. Finally, since this method relies on inferring the length of film from the diameter of the roll, the actual length is dependent on the thickness of the film and the diameter of the core on which it is wound, both of which can vary.

Motion picture films containing a magnetic recording stripe or a magnetic recording layer have been described. For example, U.S. Pat. Nos. 4,008,088 and 4,341,855 disclose a motion picture film containing a magnetic recording stripe for use in sound recording. However, the application of a magnetic recording stripe onto a photographic film is very undesirable from a manufacturing standpoint.

An innovation in data communication between different stages of film use and processing for motion picture film was introduced as described in the publication "DATAKODE Magnetic Control Surface" by Eastman Kodak Company 1983 (Publication No. V3-517). A layer approximately 5 $\mu$m thick containing magnetic oxide particles was coated across the entire back surface of a roll of motion picture film to provide the capability to magnetically record digital data on the film without interfering with normal photographic use of the film. It has been suggested that this permitted recording of different types of digital data at different stages of production of a motion picture which allowed for information exchange such as camera, lighting and filter data at the time of shooting to printer exposure control information in the laboratory to theater automation control signals during exhibition. There has been no suggestion, however, to employ such magnetic surface to monitoring the amount of unexposed film remaining in a motion picture film magazine.

More recently, it has been proposed to employ a virtually transparent magnetic layer on still photography filmstrip to allow for magnetic recording of data in one or more longitudinal tracks associated with individual film image frames for information exchange purposes as part of the recently introduced Advanced Photo System. An example of such a system is described in commonly assigned U.S. Pat. No. 4,965,627 issued Oct. 23, 1990. In order to provide quick access to particular data at any stage of film use, related data is preferably grouped and recorded in specific predetermined tracks. Camera data is recorded in several dedicated longitudinal tracks located along the filmstrip edges. The data is preferably recorded in pulse position encoded form in order to be largely independent of film transport velocity.

There has also been proposed, recently, still photography camera systems that allow for removal of a film roll before all available film frames have been exposed, and later insertion in the same or different camera for exposure of the remaining film frames without double exposure of the previously exposed frames. This feature is generally referred to as "Mid-Roll Interrupt" (or MRI) or "Mid-Roll Change" (or MRC). While a number of arrangements have been proposed for implementing this feature, one that is generally accepted involves detecting the existence of magnetically recorded data adjacent exposed frames during loading of the film into the camera to position the film at the next available unexposed frame as indicated by the absence of recorded data. In less expensive MRC-equipped cameras it is necessary only to detect the existence of recorded data without decoding the detected data to implement the MRC function. In more sophisticated cameras, it may also be required that the data be decoded for transfer of operating control information to the camera controller while at the same time serving as an indicator of exposed frame positions. Representative patents which disclose MRC camera features for use with films having a magnetic recording layer include U.S. Pat. Nos. 5,006,873, 5,477,289, and 5,519,462. While one function of such still photography systems is to distinguish between exposed and unexposed areas on a film strip, there is no disclosure relating to monitoring the amount of unexposed film remaining in a motion picture film magazine.

U.S. Pat. No. 5,737,650 describes a photographic medium cartridge with a magnetically activated status indicator. The status indicator is designed to provide information, through interaction with a magnetic member carried on a photographic filmstrip, as to whether the filmstrip has been properly loaded into a camera, whether the filmstrip in the cartridge is exposed or unexposed, and the number of exposures made or remaining to be made on the filmstrip in the cartridge.

It is a general aim of the present invention to provide an improved method for easily and accurately determining and indicating the amount of unexposed photographic film remaining in a motion picture film magazine.

SUMMARY OF THE INVENTION

In accordance with the present invention there is provided a method for monitoring the amount of unexposed photographic film remaining in a motion picture camera film magazine that includes the steps of: providing an unexposed motion picture film containing a support having at least one light sensitive image recording layer and a transparent magnetic recording layer; recording film length data on the transparent magnetic recording layer of the unexposed motion picture film; loading the unexposed motion picture film in a motion picture film magazine; and reading the film length data from the transparent magnetic recording layer as it is removed from the film supply magazine to provide an indication of the amount of unexposed film remaining in the motion picture film magazine. The amount of unexposed film remaining may be displayed in a read-out device associated with the film magazine or camera.

DETAILED DESCRIPTION OF THE INVENTION

Figure 1:
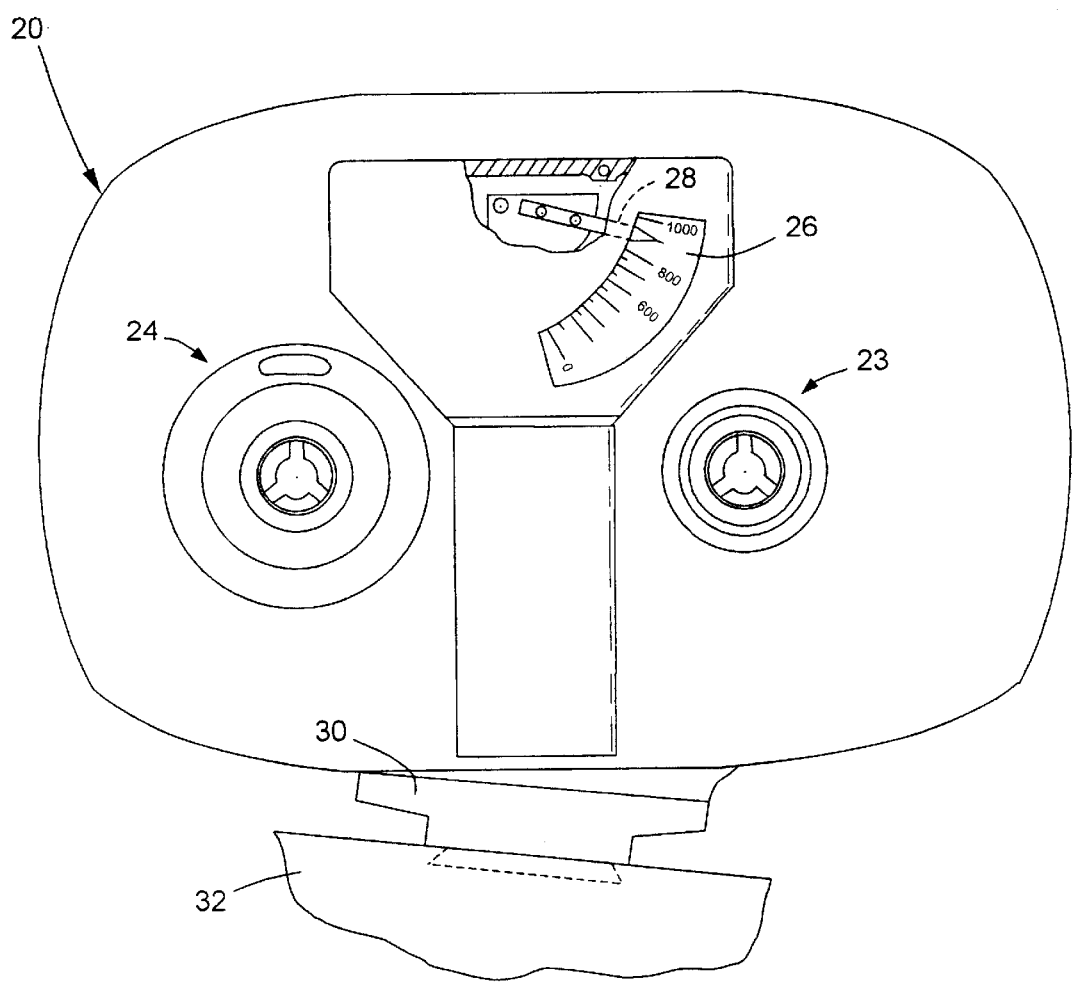
FIG. 1 is a side elevation of a motion picture camera having of the prior art.
Figure 2:
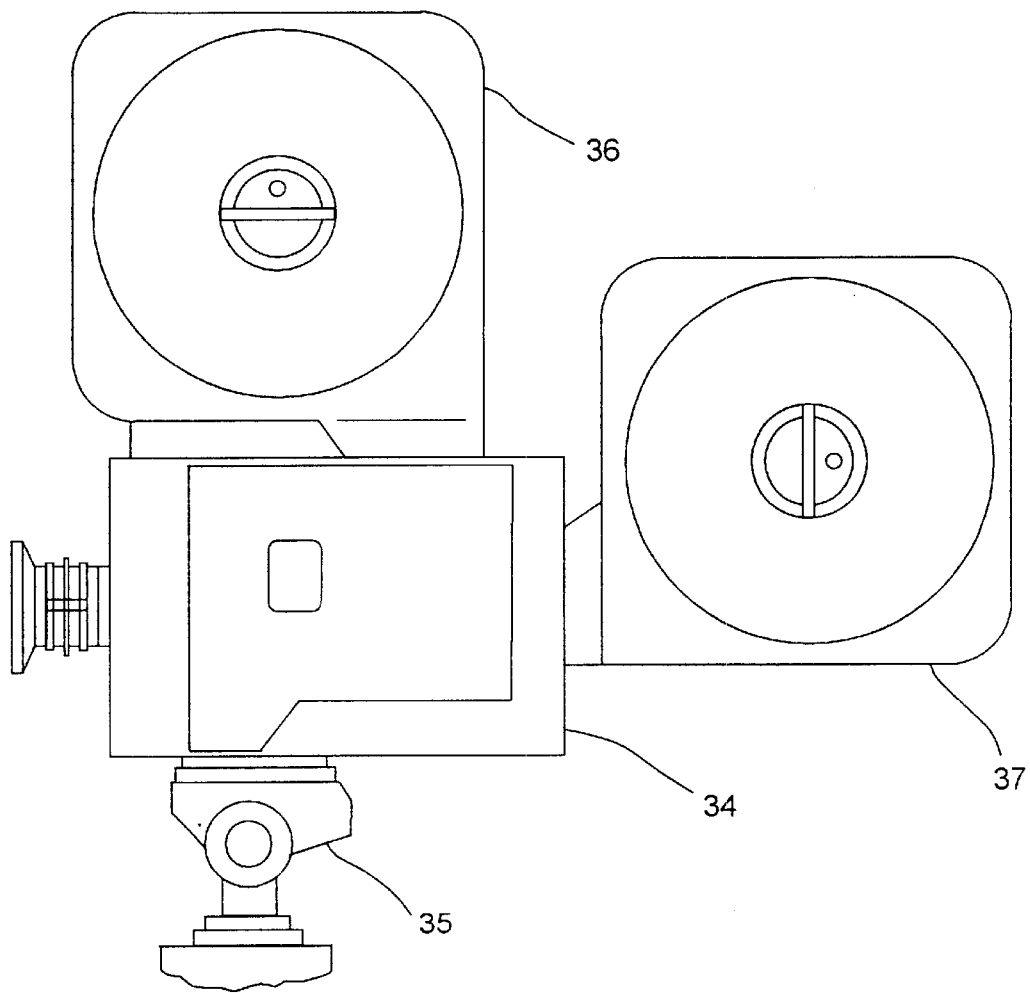
FIG. 2 is a side elevation of a motion picture camera having separate film magazines of the prior art, one magazine each for exposed and unexposed film.

The present invention provides a method to accurately monitor the amount of unexposed photographic film remaining in a motion picture camera film magazine. The photographic film for the purpose of the invention is a motion picture film containing a support having at least one light sensitive image recording layer and a transparent magnetic recording layer. Film length data is recorded on the transparent magnetic recording layer of the unexposed motion picture film. The unexposed film containing encoded film length data is loaded into a motion picture motion picture film magazine and the film length data is read from the transparent magnetic recording layer as it is removed from the film supply magazine to provide an indication of the amount of unexposed film remaining in the motion picture film magazine. The amount of unexposed film remaining may be displayed in a read-out device associated with the film magazine or camera. The information encoded on the film may also provide a means to give a visible or audio warning that the end of the roll is approaching.

In the practice of the present invention, film length or frame number data is digitally recorded onto a transparent magnetic recording layer contained on a negative motion picture camera film using a magnetic recording head. The data may be recorded during film manufacture, for example during the so-called finishing operation that involves film slitting and perforating or during spooling of the film into rolls, or during actual loading of the film in a magazine. The length or frame number data may be recorded by conventional translational motion past a recording head or by anhysteretic recording from a tape or drum as described in U.S. Pat. Nos. 5,764,429, 5,581,417, 5,572,267, and 5,234,762. During the recording operation, an additional read head can be used to verify the data that was transferred to the film. The roll length data may be recorded in any length measure that is convenient, for example, in meters or feet, or in tenths of meters or feet. Alternatively, number of frames remaining may be recorded, e.g., in conventional units of 16 frames per foot.

The roll length or frame number data is preferably recorded such that the roll length or frame number on the roll descends as the roll is used. In other words, the highest length value or frame number would be equal to zero at the core of the roll and be equal to the total roll length or total number of frames at the outer end of the roll. Typically, camera negative film is supplied to the customer in 400 to 1000 foot rolls. Thus, for example, for a 1000 foot roll, the roll length recorded at the core of the roll would be equal to 0 and at the outer end of the roll, the recorded length would be 1000.

Motion picture cameras employed in the practice of the present invention may be equipped with a magnetic read head for reading the film length or frame number data. The position of the read head in the camera can vary from camera type to camera type, depending on the space available in the camera body or the magazine. Preferably, the read head is located in the camera magazine. Alternatively, a separate module containing the magnetic head may be placed between the camera magazine and the camera body so that no modifications are required to either the camera or the magazine. The read head is preferably located close to the take-up or supply reel of the magazine, where the speed of the film surface is more constant, as magnetic recording is prone to tape speed variation errors. Film length data may be prerecorded during manufacturing in desired roll lengths as described above. Alternatively, the film length data may be recorded as the film is loaded into the magazine. In such embodiment, a single read/write magnetic head associated with the magazine may be conveniently used to both record the film length data as well as to read the data upon use of the film. To minimize the need for apparatus modifications, the amount of film remaining in the magazine may also be recorded on a leading end of the film, and read by a separate portable (e.g., hand held) magnetic reading device which is distinct from the camera or film cartridge.

In one embodiment, the film length or number of frames remaining may be read and together with data for the camera film rate (for example, 90 feet/min or 24 frames/sec) can used to calculate via a microprocessor associated with the camera, magazine, or a separate module between the camera and the magazine which also includes the magnetic read head and display on a continuous basis the amount of time remaining on the roll (for example, minutes and seconds) for filming. The display can be, for example, an LED display or any other conventional read-out device.

Figure 3:
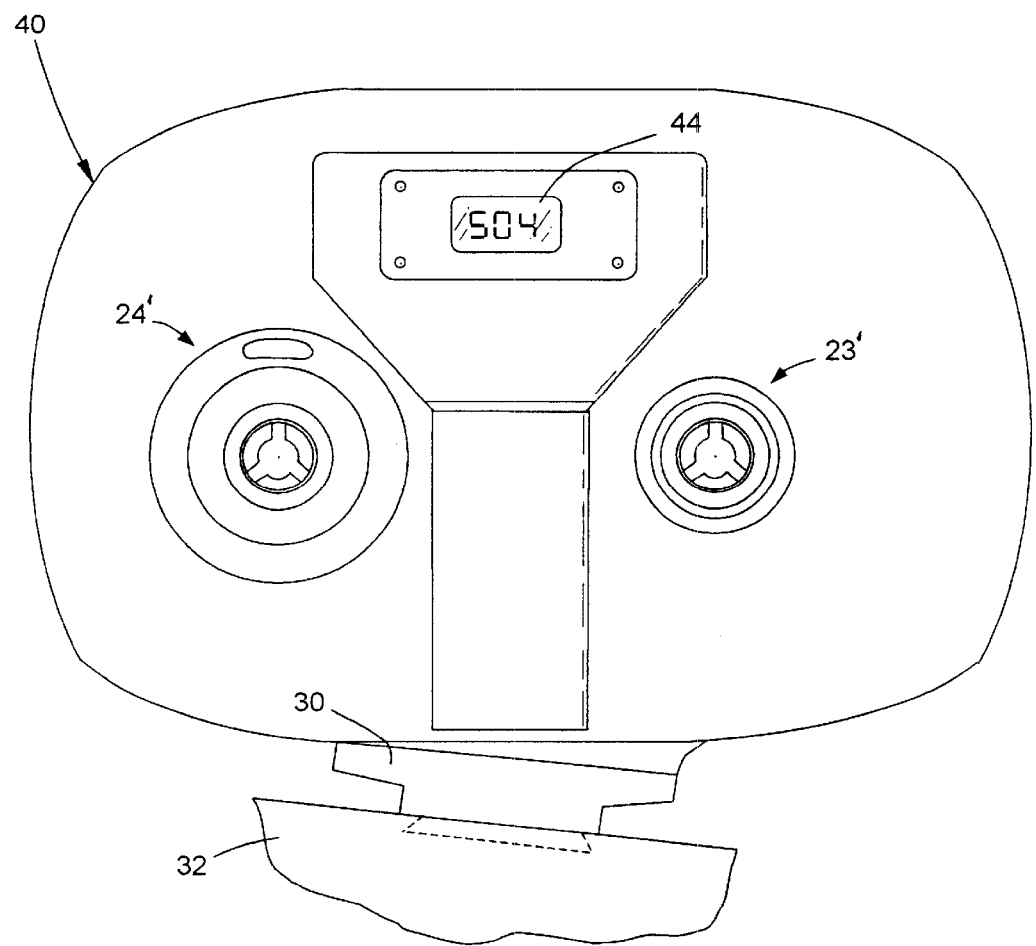
FIG. 3 is a side elevation of a motion picture camera film magazine of the invention having a display for the amount of unexposed film remaining in the magazine.

Referring now to FIG. 3 of the invention, film magazine 40 contains supply reel 23' and takeup reel 24'. Film is conveyed from the supply reel 23' through the light trap block 30 into the interior of the motion picture camera 32. The film magazine 40 has a display device 44 which provides a readout for the amount of unexposed film remaining on supply reel 23'. In the example illustrated here, the display device is an LED display indicating the amount of unexposed film (e.g., 504 feet) remaining.

Figure 4:
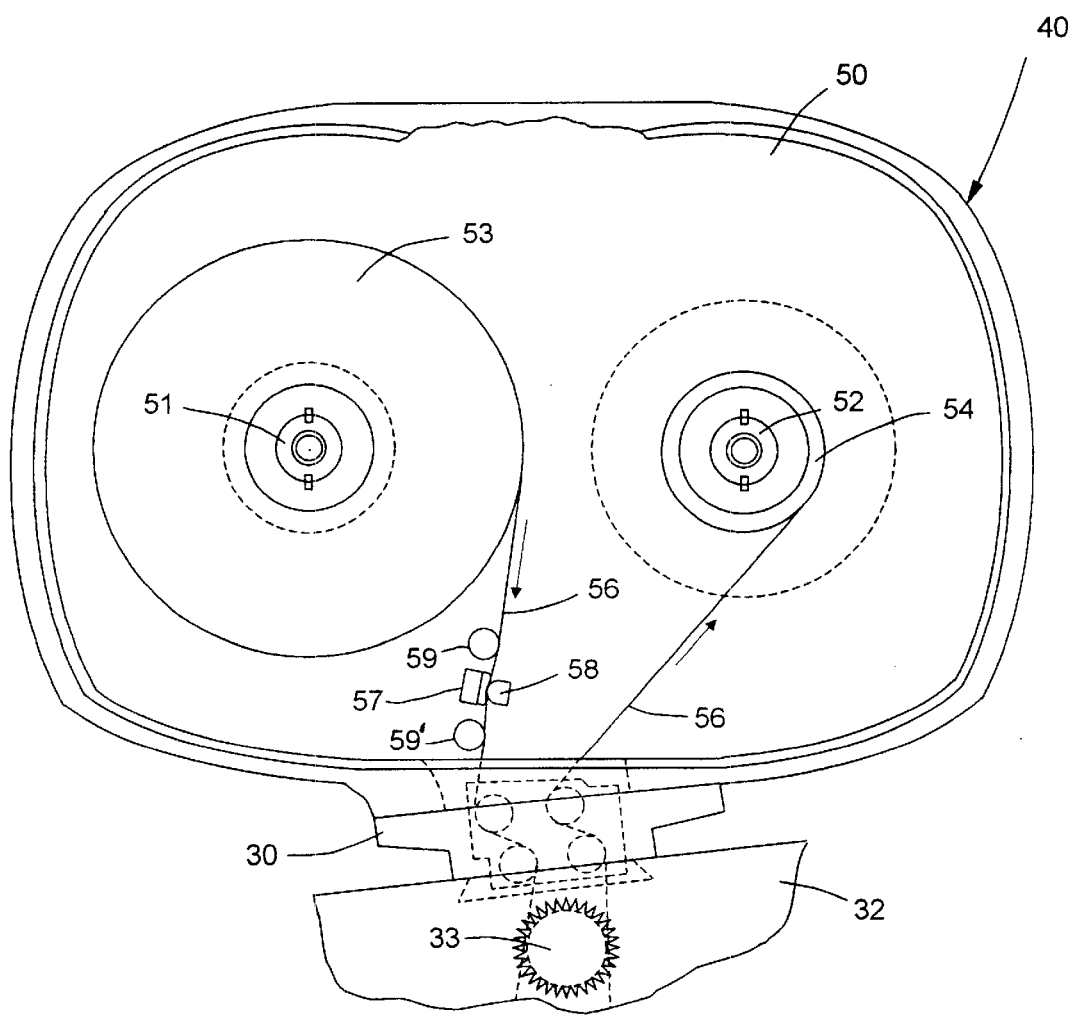
FIG. 4 is a side elevation showing an interior view of the other side of the same film magazine of FIG. 3.

FIG. 4 shows an interior view of the other side of film magazine 40 of FIG. 3, and where parts correspond they carry the same numbers. Supply hub 51 and takeup hub 52 are both mounted for rotation within the interior space 50 of the magazine 40. A supply reel of film 53 is mounted on hub 51 and a takeup reel of film 54 is mounted on the takeup hub 52. A film strip 56 extends from the supply reel 53 and conveys between pressure pad 57 and magnetic read head 58. Film length data encoded on the transparent magnetic recording layer contained on the backside of film strip 56 is picked up by magnetic read head 58, and after being fed to a preamplifier (not shown) and central processing unit (not shown), the data is then sent to display device 44. Capstans 59 and 59' before and after the read head 58 may be used to insure good film transport and film flatness in the vicinity of the read head 58. The film then passes through light trap block 30 into the interior of the motion picture camera 32. A single sprocket wheel 33 may be employed in the motion picture camera 32 for controlling the rate of movement of the film strip 56 into and out of the motion picture camera 18. After exposure in the motion picture camera 32, film strip 56 is conveyed over sprocket wheel 33, through light trap block 30 and is wound onto takeup reel 54.

Figure 5:
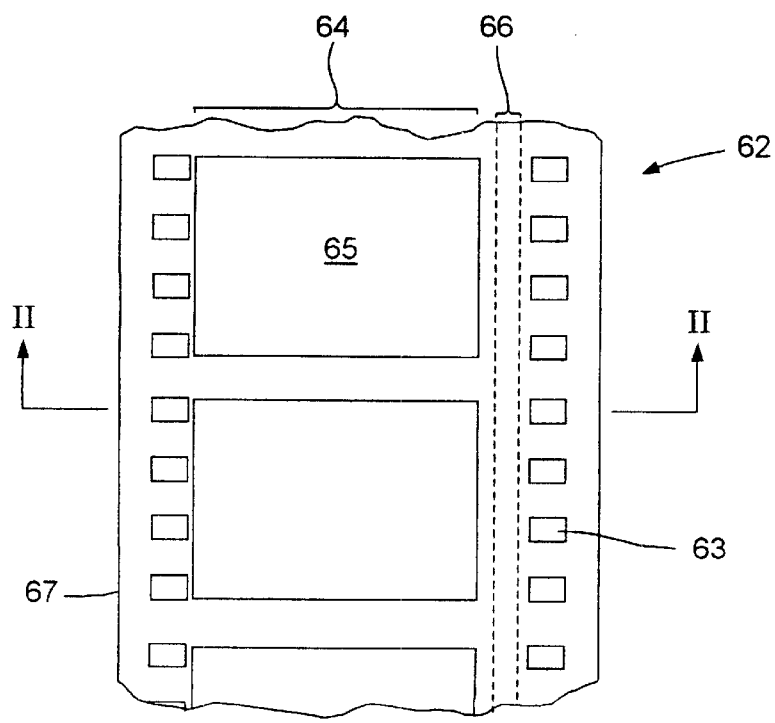
FIG. 5 is a top plane view of a motion picture film having a transparent magnetic recording layer for use in a film magazine of FIGS. 3 and 4.
Figure 6:
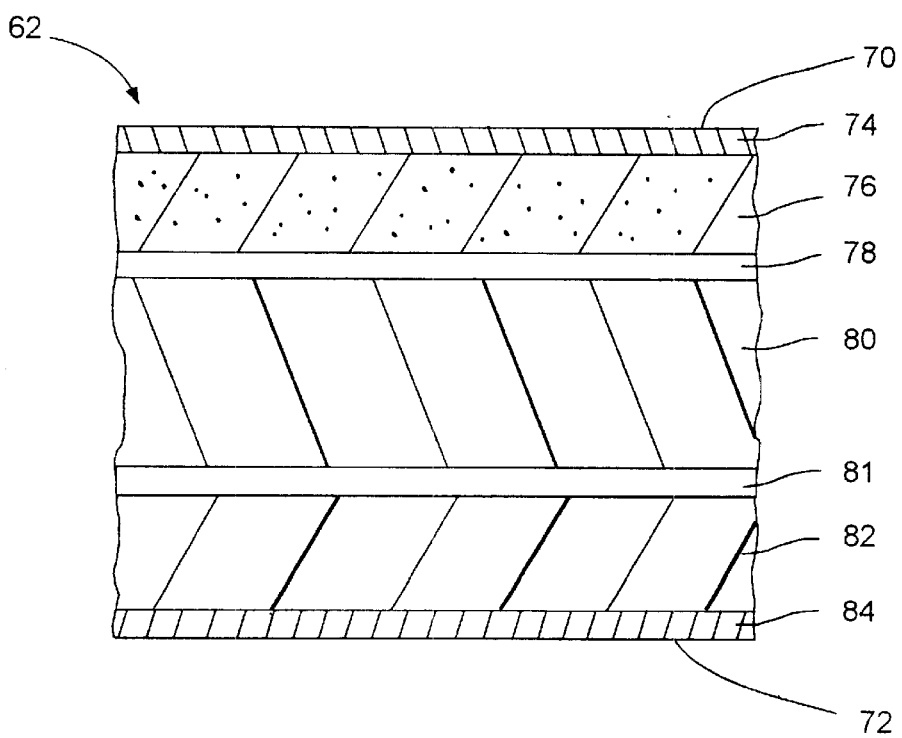
FIG. 6 is a cross-sectional view of the motion picture film of FIG. 5 as taken along line II—II.

Referring now to FIGS. 5 and 6 there is shown a motion picture film 62 for use in the present invention, FIG. 5 shows a top plane view of the motion picture film 62 while FIG. 6 is a cross-sectional view of the motion picture film 62 of FIG. 5 as taken along line II—II.

On motion picture film 62 there is provided image area 64 wherein images 65 are formed in a light-sensitive image recording layer 82. Also provided on motion picture film 62 is magnetic recording area 66, which in the particular embodiment illustrated is disposed laterally outside of the image area 64 and adjacent to the perforations 63. This "inboard" location for the magnetic recording area 66 is preferred since the film is very flat in this area which insures good film to magnetic read or write head contact. However, since the transparent magnetic recording layer 76 is coated across the entire film surface, the magnetic recording area 66 may be located elsewhere. For example, between the film perforations 63 and the edge of the film 67 on either side or both sides of the motion picture film 62.

Referring now to FIG. 6, the motion picture film 62 comprises a backside surface 70 and a frontside surface 72. The motion picture film 62 includes a support member 80 and disposed on one side thereof, in order from the backside surface 70, a thin lubricant layer 74, a transparent magnetic recording layer 76, and, in the particular embodiment illustrated, an antistatic layer 78. Optionally, a priming or subbing layer (not shown) which is well known in the photographic art may be employed between the antistatic layer 78 and the support member 80 in order to improve adhesion. Disposed on the opposite side of the support member 80, in order from the frontside surface 72, a protective overcoat layer 84, light-sensitive image recording layer(s) 82, and, in the particular embodiment illustrated, an antihalation underlayer 81. Optionally, a priming or subbing layer (not shown) which is well known in the photographic art may be employed between the antihalation underlayer 81 and the support member 80 in order to improve adhesion.

The materials employed as the support member are synthetic high molecular weight polymeric materials. These materials may be comprised of various polymeric films, but polyester and cellulose triacetate film supports, which are well known in the art, are preferred. The thickness of the support member is not critical. Conventional support thicknesses of from about 50 to 250 microns (2 to 10 mils, or 0.002 to 0.010 inches) can be employed, for example, with very satisfactory results. If the thickness is below 50 microns, the emulsion induced curl makes it difficult to maintain head/media contact without increasing the load and wear on the film surface. If the thickness is more than 250 microns the media is very stiff and this affects film transport and head media contact as well as reducing the length of film that can be loaded into a magazine. Polyester support members typically employ an undercoat or primer layer between the functional layers and the polyester support member. Such undercoat layers are well known in the art and comprise, for example, a vinylidene chloride/methyl acrylate/itaconic acid terpolymer or vinylidene chloride/acrylonitrile/acrylic acid terpolymer as described in U.S. Pat. Nos. 2,627,088; 2,698,235; 2,698,240; 2,943,937; 3,143,421; 3,201,249; 3,271,178 and 3,501,301.

The motion picture film useful in the practice of the present invention comprise at least one light sensitive image recording layer. Such films can be simple black-and-white or monochrome elements or they can be multilayer and/or multicolor elements. Color motion picture films useful for this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art. The compositions of the light sensitive image recording layers is not critical to the invention, as any of the silver halide materials used in conventional motion picture films may be used, such as those described, e.g., in Research Disclosure, Item 36544, September, 1994, and the references listed therein.

The motion picture films useful in the practice of the present invention include a transparent magnetic recording layer. Transparent magnetic recording layers for use on imaging elements such as photographic films are well known in the imaging art and are described, for example, in U.S. Pat. Nos. 3,782,947; 4,279,945; 4,302,523; 4,990,276; 5,147,768; 5,215,874; 5,217,804; 5,227,283; 5,229,259; 5,252,441; 5,254,449; 5,294,525; 5,335,589; 5,336,589;

5,382,494; 5,395,743; 5,397,826; 5,413,900; 5,427,900; 5,432,050; 5,457,012; 5,459,021; 5,491,051; 5,498,512; 5,514,528 and others; and in Research Disclosure, item No. 34390 (November, 1992). Preferably, such magnetic recording layers comprises materials of the type employed in the recently commercialized Advanced Photo System and described in U.S. Pat. Nos. 5,395,743; 5,397,826; 5,427,900; 5,432,050; 5,436,120; and 5,424,037. While the use of magnetic recording layers with motion picture films has been previously suggested as discussed above with respect to DATAKODE systems, compared to the newly commercialized Advanced Photo System consumer films in which the magnetic recording layer is about 1.2 $\mu$m thick, the DATAKODE magnetic control surface was a relatively thick layer of magnetic oxide (about 5 micron) that was coated across the entire surface of a roll of motion picture film. The DATAKODE magnetic recording layer had limited recording density capability due to its wide pulse width, leading to poorer resolution between flux reversals, and imparted undesirable optical density and color to the motion picture film. In addition, the DATAKODE magnetic recording layer was overcoated with a carbon black-containing layer which functioned as an antihalation layer and antistatic layer for the unprocessed film. The presence of this carbon black-containing overcoat on unprocessed films created a spacing loss between the magnetic recording layer and the magnetic read and write heads, thus negatively impacting the magnetic recording characteristics of the DATAKODE film by reducing signal amplitude and increasing the noise levels. Thus it would be undesirable for use in the practice of the present invention. Accordingly, in preferred embodiments of the invention, a photographic film is used employing a relatively thinner magnetic recording layer in combination with antistatic and antihalation layers as described below, rather than a relatively thick magnetic recording layer in combination with a carbon black-containing overcoat backing layer as employed with DATAKODE films.

Transparent magnetic recording layers that may be effectively employed for the purpose of the present invention comprise a film-forming polymeric binder, ferromagnetic particles, and other optional addenda for improved manufacturability or performance such as dispersants, coating aids, fluorinated surfactants, crosslinking agents or hardeners, catalysts, charge control agents, lubricants, abrasive particles, filler particles, plasticizers and the like.

Suitable ferromagnetic particles comprise ferromagnetic iron oxides, such as: y-$Fe_2O_3$ or magnetite; y-$Fe_2O_3$ or magnetite with Co, Zn, Ni or other metals in solid solution or surface-treated; ferromagnetic chromium dioxides such as $CrO_2$ or $CrO_2$ with Li, Na, Sn, Pb, Fe, Co, Ni, Zn or halogen atoms in solid solution; ferromagnetic hexagonal ferrites, such as barium and strontium ferrite; ferromagnetic metal alloys with protective oxide coatings on their surface to improve chemical stability. Other surface-treatments of magnetic particles to increase chemical stability or improve dispersability known in the conventional magnetic recording art may also be practiced. In addition, ferromagnetic oxide particles can be overcoated with a shell consisting of a lower refractive index particulate inorganic material or a polymeric material with a lower optical scattering cross-section as taught in U.S. Pat. Nos. 5,217,804 and 5,252,444. Suitable ferromagnetic particles can exhibit a variety of sizes, shapes, and aspect ratios. Particularly preferred ferromagnetic particles for use in transparent magnetic layers on motion picture films for use in the present invention include cobalt surface-treated $Fe_3O_4$ (magnetite) with a specific surface area greater than 30 $m^2/g$, preferably more than 40 $m^2/g$.

As taught in U.S. Pat. No. 3,782,947, whether an imaging element is useful for both photographic and magnetic recording depends both on the size distribution and the concentration of the ferromagnetic particles and on the relationship between the granularities of the magnetic and photographic layers. Generally, the coarser the grain of the silver halide emulsion in the photographic film containing a magnetic recording layer, the larger the mean size of the magnetic particles which are suitable. A magnetic particle coverage for the magnetic layer of from about 10 to 1000 $mg/m^2$, when uniformly distributed across the imaging area of a photographic imaging element, provides a magnetic layer that is suitably transparent to be useful for photographic imaging applications for magnetic particles with a maximum primary particle size of less than about 0.1 $\mu$m. Magnetic particle coverages less than about 10 $mg/m^2$ tend to be insufficient for magnetic recording purposes using inductive write/read heads.

Magnetic particle coverages greater than about 1000 $mg/m^2$ tend to produce magnetic layers with optical densities too high for photographic imaging. To minimize layer thicknesses, particle coverages of less than 200 $mg/M^2$ are desired, while particularly useful particle coverages are in the range of 20 to 70 $mg/m^2$. Magnetic particle volume concentrations in the coated layers of from about $1\times10^{-11}$ $mg/mm^3$ to $1\times10^{-10}$ $mg/mm^3$ are particularly preferred for transparent magnetic layers prepared for use in photographic elements of this invention. A typical thickness for the transparent magnetic layer is in the range from about 0.05 to 10 $\mu$m, preferably less than 4 $\mu$m, more preferably less than or equal to 1.2 $\mu$m, even more preferably less than or equal to 0.7 $\mu$m and most preferably less than or equal to 0.5 $\mu$m. Practical difficulties exist in making thin films, including preparation of high quality, narrow size distribution dispersions of small particles of magnetic pigments, abrasive/head polishing powders and antistat particles. Other difficulties include maintaining coating thickness uniformity and achieving good layer adhesion and durability. Such difficulties may be addressed in accordance with the teachings of the above and below referenced patents.

In order to provide sufficient magnetic recording capacity for various purposes of the present invention, the properties of the transparent magnetic recording layer on the motion picture film and the write/read recording heads together with the encoding system preferably are capable of a recording density of at least 1000 bits/track/frame, and more preferably, at least 2000 bits/track/frame, although lower recording densities may be sufficient for limited purposes. The Advanced Photo System specification (Eastman Kodak Company, Release 4.30, Oct. 17, 1997) defines a maximum recording density of 120 flux transitions per millimeter. The cameras used in this system, being low-cost consumer devices, have film-transport mechanisms that exhibit high levels of instantaneous speed variation (known as "jitter"). In order to accommodate this, a jitter-tolerant—and consequently low-efficiency—modulation code is used. This self-clocking peak position modulation code uses three flux transitions to code each data bit, which limits the data-storage density of the system to (120 flux transitions per millimeter)÷(3 flux transitions per bit)=40 bits per millimeter. The significantly reduced levels of jitter to be expected in motion-picture cameras should enable the use of a highly efficient, jitter-tolerant nonlinear run-length-limited modulation code such as that taught in U.S. Pat. No. 5,742,244. Such a code requires as few as 1.25 flux transitions to code one bit while accommodating moderate levels of jitter. The use of such a code would provide a storage density of (120 flux transitions per millimeter)÷(1.25 flux transitions per bit)=96 bits per millimeter. Using a reasonable error-correction and data-format overhead of 25%, 75% of the data stored is available for user data, resulting in an effective storage density of (96×0.75)=72 bits per millimeter. Given a reasonable track length per frame of 19 millimeters, (72× 19)=1368 bits can be stored per track per frame, which should be adequate for this application.

Suitable polymeric binders for use in the transparent magnetic recording layer include, for example: vinyl chloride based copolymers such as, vinyl chloride-vinyl acetate copolymers, vinyl chloride-vinyl acetate-vinyl alcohol terpolymers, vinyl chloride-vinyl acetate-maleic acid terpolymers, vinyl chloride-vinylidene chloride copolymers, vinyl chloride-acrylonitrile copolymers ; acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-acrylic acid terpolymers, acrylonitrile-butadiene-methacrylic acid terpolymers, polyvinyl butyral, polyvinyl acetal, cellulose derivatives such as cellulose esters including cellulose nitrate, cellulose acetate, cellulose diacetate, cellulose triacetate, cellulose acetate butyrate, cellulose acetate proprionate, and mixtures thereof, and the like; styrene-butadiene copolymers, polyester resins, phenolic resins, epoxy resins, thermosetting polyurethane resins, urea resins, melamine resins, alkyl resins, urea-formaldehyde resins and other synthetic resins. Preferred binders for organic solvent-coated transparent magnetic recording layers are polyurethanes, vinyl chloride-based copolymers and cellulose esters, particularly cellulose diacetate and cellulose triacetate.

The binder for transparent magnetic recording layers can also be film-forming hydrophilic polymers such as water soluble polymers, cellulose ethers, latex polymers and water soluble polyesters as described in Research Disclosures Nos. 17643 (December, 1978) and 18716 (November, 1979) and U.S. Pat. Nos. 5,147,768; 5,457,012; 5,520,954 and 5,531, 913. Suitable water-soluble polymers include gelatin, gelatin derivatives, casein, agar, starch derivatives, polyvinyl alcohol, acrylic acid copolymers, and maleic acid anhydride. Suitable cellulose ethers include carboxymethyl cellulose and hydroxyethyl cellulose. Other suitable aqueous binders include aqueous latices of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl chloride copolymers and vinylidene chloride copolymers, and butadiene copolymers and aqueous dispersions of polyurethanes or polyesterionomers. The preferred hydrophilic binders are gelatin, gelatin derivatives and combinations of gelatin with a polymeric cobinder. The gelatin may be any of the so-called alkali- or acid-treated gelatins.

Optionally, the binder in the magnetic layer may be cross-linked. Binders which contain active hydrogen atoms including —OH, —NH(2), —NHR, where R is an organic radical, and the like, can be crosslinked using an isocyanate or polyisocyanate as described in U.S. Pat. No. 3,479,310. Suitable polyisocyanates include: tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the forgoing, polyisocyanates prepared by reacting an excess of an organic diisocyanate with an active hydrogen containing compounds such as polyols, polyethers and polyesters and the like, including ethylene glycol, propylene glycol, dipropylene glycol, butylene glycol, trimethylol propane, hexanetriol, glycerine sorbitol, pentaerythritol, castor oil, ethylenediamine, hexamethylenediamine, ethanolamine, diethanolamine, triethanolamine, water, ammonia, urea, and the like, including biuret compounds, allophanate compounds and the like. A preferred polyisocyanate crosslinking agent is the reaction product of trimethylol propane and 2,4-tolylene diisocyanate sold by Mobay under the tradename Mondur CB 75.

The hydrophilic binders can be hardened using any of a variety of means known to one skilled in the art. Useful hardening agents include aldehyde compounds such as formaldehyde, ketone compounds, isocyanates, aziridine compounds, epoxy compounds, chrome alum, and zirconium sulfate.

Examples of suitable solvents for coating the transparent magnetic layer include: water; ketones, such as acetone, methyl ethyl ketone, methylisobutyl ketone, tetrahydrofuran, and cyclohexanone; alcohols, such as methanol, ethanol, isopropanol, and butanol; esters such as ethyl acetate and butyl acetate, ethers; aromatic solvents, such as toluene; and chlorinated hydrocarbons, such as carbon tetrachloride, chloroform, dichloromethane; trichloromethane, trichloroethane; glycol ethers such as ethylene glycol monomethyl ether, and propylene glycol monomethyl ether; and ketoesters, such as methylacetoacetate. Optionally, due to the requirements of binder solubility, magnetic particle dispersability and coating rheology, a mixture of solvents may be advantageous. A preferred solvent mixture consists of a chlorinated hydrocarbon, ketone and/or alcohol, and ketoesters. Another preferred solvent mixture consists of a chlorinated hydrocarbon, ketone and/or alcohols, and a glycol ether. Preferred solvent mixtures include dichloromethane, acetone and/or methanol, methylacetoacetate; dichloromethane, acetone and/or methanol, propylene glycol monomethyl ether; and methylethyl ketone, cyclohexanone and/or toluene.

As indicated hereinabove, the transparent magnetic layer also may contain additional optional components such as dispersing agents, wetting agents, surfactants or fluorinated surfactants, coating aids, viscosity modifiers, soluble and/or solid particle dyes, antifoggants, matte particles, lubricants, abrasive particles, filler particles, and other addenda that are well known in the photographic and magnetic recording arts.

Useful dispersing agents include fatty acid amines, and commercially available wetting agents such as Witco Emcol CC59 which is a quaternary amine available from Witco Chemical Corp; Rhodofac PE 510, Rhodofac RE 610, Rhodofac RE 960, and Rhodofac LO 529 which are phosphoric acid esters available from Rhone-Poulenc; and polyester-polyamine copolymers described in commonly-assigned U.S. Pat. No. 5,395,743 and which are commercially available as Solsperse 17000, Solsperse 20000, and Solsperse 24000 from Zeneca, Inc. or PS2 and PS3 from ICI.

Suitable coating aids include nonionic fluorinated alkyl esters such as, FC-430 and FC-431 sold by Minnesota Mining and Manufacturing; polysiloxanes such as DC 1248, DC 200, DC 510, DC 190 sold by Dow Corning; and BYK 310, BYK 320, and BYK 322 sold by BYK Chemie; and SF 1079, SF 1023, SF 1054, and SF 1080 sold by General Electric.

Examples of reinforcing filler particles include nonmagnetic inorganic powders with a Moh scale hardness of at least 6. Examples of suitable metal oxides include gamma alumina, chromium (+3) oxide, alpha iron oxide, tin oxide, silica, titania, aluminosilicates, such as zeolites, clays and clay-like materials. Other suitable filler particles include various metal carbides, nitrides, and borides. Preferred filler particles include gamma alumina and silica as taught in U.S. Pat. No. 5,432,050.

Abrasive particles exhibit properties similar to those of reinforcing particles and include some of the same materials, but are typically much larger in size. Abrasive particles are present in the transparent magnetic layer to aid in cleaning of the magnetic heads as is well-known in the magnetic recording art. Preferred abrasive particles are alpha aluminum oxide and silica as disclosed in Research Disclosure, Item No. 36446 (August 1994).

A representative formulation which may be used to form a magnetic recording layer on a photographic film for use in accordance with the invention is as follows:

| Component | Description | Dry Coating Wt, mg/m$^2$ |
|---|---|---|
| Magnetic oxide | CSF-408542 Co-$\gamma$-Fe$_2$O$_3$ (Toda Kogyo Corp.) | 55 |
| Polymer binder | Cellulose diacetate (Eastman Chemical Co.) | 1248 |
| Polymer binder | Cellulose triacetate (Eastman Chemical Co.) | 55 |
| Abrasive particle (head cleaner) | B-600 (Norton) | 36 |
| Grind Solvent | Dibutyl phthalate | 78 |
| Coating Aid | FC-431 (3M Corp.) | 7.2 |
| Dispersant | Rhodafac PE510 (Rhone-Poulenc) | 4.4 |

Dry Layer Thickness: 1.2 $\mu$m

Additional layers present in the motion picture films in accordance with this invention either above or below the transparent magnetic layer may include but are not limited to antistatic layers, abrasion and scratch resistant layers, other protective layers, abrasive-containing layers, adhesion-promoting layers, antihalation layers and lubricant-containing layers overlying the magnetic layer for improved film conveyance and runnability during magnetic reading and writing operations.

Any antistatic materials may be employed in the antistatic layer, such as those previously suggested for use with photographic elements. Such materials include, e.g., ionic polymers, electronic conducting non-ionic polymers, and metal halides of metal oxides in polymer binders. Conductive fine particles of crystalline metal oxides dispersed with a polymeric binder have been used to prepare optically transparent, humidity insensitive, antistatic layers for various imaging applications. Many different metal oxides, such as AnO, TiO$_2$, ZrO$_2$, Al$_2$O$_3$, SiO$_2$, MgO, BaO, MoO$_3$, and V$_2$O$_5$, are disclosed as useful as antistatic gents in photographic elements or as conductive agents in electrostatographic elements in such patents as U.S. Pat. Nos. 4,275,103; 4,394,441; 4,416,963; 4,418,141; 4,431,764; 4,495,276; 4,571,361; 4,999,276; and 5,122,445, the disclosures of which are hereby incorporated by reference. Preferred metal oxides are antimony doped tin oxide, aluminum doped zinc oxide, and niobium doped titanium oxide, as these oxides have been found to provide acceptable performance characteristics in demanding environments. Particular preferred metal oxides for use in films in accordance with the invention are antimony-doped tin oxide and vanadium pentoxide which provide good resistance to static discharge.

Suitable lubricants for use in the thin lubricant layer include silicone oil, silicones or modified silicones, fluorine-containing alcohols, fluorine-containing esters, polyolefins, polyglycols, alkyl phosphates and alkali metal salts thereof, polyphenyl ethers, fluorine-containing alkyl sulfates and alkali metal salts thereof, monobasic fatty acids having 10 to 24 carbon atoms and metal salts thereof, alcohols having 12 to 22 carbon atoms, alkoxy alcohols having 12 to 22 carbon atoms, esters of monobasic fatty acids having one of monovalent, divalent, trivalent, tetravalent, pentavalent and hexavalent alcohols, fatty acid esters of monoalkyl ethers of alkylene oxide polymers, fatty acid amides and aliphatic ammes.

Specific examples of these compounds (i.e., alcohols, acids or esters) include lauric acid, myristic acid, palmitic acid, stearic acid, behenic acid, butyl stearate, oleic acid, octyl stearate, amyl stearate, isocetyl stearate, octyl myristate, butoxyethyl stearate, anhydrosorbitan monostearate, anhydrosorbitan distearate, anhydrosorbitan tristearate, pentaerythritol tetrastearate, oleyl alcohol and lauryl alcohol. Carnauba wax is preferred.

Representative examples of backing layer packages comprising a transparent magnetic recording layer, an antistatic layer, and a protective overcoat layer which may be employed in the motion picture films for use in accordance with the invention are disclosed, e.g., in U.S. Pat. Nos. 5,395,743; 5,397,826; 427,900; 5,432,050; 5,436,120; and 5,424,037, the disclosures of which are incorporated by reference herein.

The antihalation underlayer that may be employed in the motion picture films useful in this invention functions to prevent light from being reflected into the silver halide emulsion layer(s) and thereby causing an undesired spreading of the image which is known as halation. Any of the filter dyes known to the photographic art can be used in the present invention as a means of reducing halation. Thus, for example, water-soluble dyes can be used for this purpose. Such dyes should be incorporated in the antihalation undercoat with a mordant to prevent dye diffusion. Alternatively, and preferably, a solid particle filter dye is incorporated in the antihalation underlayer. Soluble and solid particle filter dyes that may successfully employed in the antihalation underlayer include those described, e.g., in commonly-assigned U.S. Pat. No. 5,679,505 which is incorporated herein by reference.

In addition to a transparent magnetic recording layer, one or more silver halide emulsion layers, and optional antihalation underlayer and antistatic layer, the photographic films useful for the present invention can contain auxiliary layers conventional in photographic elements, such as overcoat layers, spacer layers, electrically conductive layers, filter layers, interlayers, pH lowering layers (sometimes referred to as acid layers and neutralizing layers), timing layers, opaque reflecting layers, opaque light-absorbing layers and the like.

We claim:

1. A method for monitoring the amount of unexposed photographic film remaining in a motion picture film magazine comprising:

providing an unexposed motion picture film comprising a support bearing at least one light sensitive image recording layer and a transparent magnetic recording layer;

recording film length data in the transparent magnetic recording layer of the unexposed motion picture film;

loading the unexposed motion picture film in a motion picture film magazine; and reading the film length data from the transparent magnetic recording layer as it is removed from the film magazine to provide an indication of the amount of unexposed film remaining in the motion picture film magazine.

2. The method of claim 1, wherein the film length data is read from the transparent magnetic recording layer by a magnetic read head associated with the film magazine or a motion picture camera to which the magazine is attached, and an indication of the amount of unexposed film remaining in the motion picture film magazine is displayed in a read-out device associated with the film magazine or camera.

3. The method of claim 1, wherein the film length data is recorded in the transparent magnetic recording layer as it is loaded in the motion picture film magazine.

4. The method of claim 1, wherein the film length data is pre-recorded during manufacture of the photographic film.

5. The method of claim 1, wherein the film in the magazine is separated from an exposed portion of the film removed from the magazine, and data indicating the amount of unexposed film remaining in the magazine is recorded on the leading end of the film remaining in the magazine.

6. The method of claim 5, wherein the data indicating the amount of unexposed film remaining in the magazine recorded on the leading end of the film remaining in the magazine is read by a magnetic read head which is not part of the film magazine or camera.

7. The method of claim 1, further comprising providing a visible or audio warning that the end of the unexposed film is approaching.

8. The method of claim 1, further comprising calculating the amount of time remaining on a roll of the unexposed film in the magazine for filming based upon the film length data and data for a camera film rate, and displaying the calculated time on a continuous basis during filming of a motion picture scene.

9. A method according to claim 1, wherein the motion picture film additionally comprises an antihalation undercoat layer between the support and the light sensitive image recording layer and an antistatic layer.

10. A method according to claim 9, wherein the magnetic recording layer comprises magnetic particles at a coverage in the range of 20 to 70 mg/m$^2$.

11. A method according to claim 10, wherein the magnetic recording layer thickness is less than 4 μm.

12. A method according to claim 10, wherein the magnetic recording layer thickness is less than or equal to 1.2 μm.

13. A method according to claim 1, wherein the magnetic recording layer thickness is less than 4 μm.

14. A method according to claim 1, wherein the magnetic recording layer thickness is less than or equal to 1.2 μm.

* * * * *